(12) United States Patent
Puc et al.

(10) Patent No.: US 6,604,872 B2
(45) Date of Patent: Aug. 12, 2003

(54) METHOD AND APPARATUS FOR IMPROVING SPECTRAL EFFICIENCY IN FIBER-OPTIC COMMUNICATION SYSTEMS

(75) Inventors: Andrej B. Puc, Atlantic Highlands, NJ (US); Alexei N. Pilipetskii, Colts Neck, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/205,134

(22) Filed: Jul. 25, 2002

(65) Prior Publication Data

US 2003/0002113 A1 Jan. 2, 2003

Related U.S. Application Data

(62) Division of application No. 09/250,297, filed on Feb. 17, 1999, now Pat. No. 6,452,707.

(51) Int. Cl.[7] .......................... H04B 10/00; H04B 10/08
(52) U.S. Cl. .......................... 398/158; 398/28; 398/13
(58) Field of Search ................................. 359/110, 111, 359/154, 161, 173

(56) References Cited

U.S. PATENT DOCUMENTS

| | | | |
|---|---|---|---|
| 5,351,148 A | | 9/1994 | Maeda et al. ............... 359/124 |
| 5,715,076 A | | 2/1998 | Alexander et al. .......... 359/130 |
| 5,896,211 A | | 4/1999 | Watanabe .................... 359/124 |
| 5,937,126 A | * | 8/1999 | Yamamoto et al. .......... 385/123 |
| 6,040,933 A | | 3/2000 | Khaleghi et al. ............ 359/124 |
| 6,229,631 B1 | * | 5/2001 | Sato et al. ................... 359/110 |
| 6,259,543 B1 | * | 7/2001 | Golovchenko et al. ...... 359/110 |
| 6,396,606 B1 | * | 5/2002 | Mao .......................... 359/156 |
| 6,433,904 B1 | * | 8/2002 | Swanson et al. ............ 359/133 |

OTHER PUBLICATIONS

CA Ivan P. Kaminow et al., Optical Fiber Telecommunications IIIA, Academic Press (1997), pp. 58–61.
CB Claude Berrou et al., "Near Shannon Limit Error—Correcting Coding and Decoding: Turbo Codes (1)", IEEE Int'l Conf. on Comm. (1993), pp. 1064–1070.
CC J.C. Livas et al., "Forward Error Correction in a 1 Gbit/S/Channel Wavelength–Division–Multiplexed System", IEEE/LEOS Summer Topical Meeting on Optical Networks and Their Enabling Technologies, Jul. 11, 1994, pp. 1064–1070.
CD A. Willner, "Feasibility Study on 1 bit/s/Hz High Spectral Efficiency WDM with Optical Duobinary Coding and Polarization Interleave Multiplexing", Conference on Optical Fiber Communications, U.S., New York, IEEE, Feb. 16, 1997, pp. 43–45.
CE S. Aisawa et al., "Dispersion–Compensation–Free 16×10 Gbit/s WDM Transmission in 1580nm Band Over 640 km of Dispersion–Shifted Fibre by Employing Optical Duobinary Coding", Electronic Letters, GB, IEE Stevenage, vol. 34, No. 5, Mar. 5, 1998, pp. 480–481.

* cited by examiner

*Primary Examiner*—Leslie Pascal
*Assistant Examiner*—Dalzid Singh

(57) ABSTRACT

A method for designing an optical system is disclosed. The optical system launches optical signals modulated with data into a fiber link having a property of inducing nonlinear distortion of the optical signals as a function of signal power of the optical signals and distance traversed in the fiber link. A Q-factor curve for the fiber link is determined as a function of the signal power. A signal power is preselected based on the Q-factor curve. The preselected signal power is associated with a set of channels. A coding gain is preselected based on the preselected signal power and a desired channel spacing for the set of channels.

10 Claims, 4 Drawing Sheets

METHOD AND APPARATUS FOR IMPROVING SPECTRAL EFFICIENCY IN FIBER-OPTIC COMMUNICATION SYSTEMS

CROSS REFERENCE TO RELATED APPLICATION

This is a divisional application of application Ser. No. 09/250,297, filed on Feb. 17, 1999, entitled "Method and Apparatus for Improving Spectral Efficiency in Fiber-Optic Communication Systems", now U.S. Pat. No. 6,452,707.

BACKGROUND OF THE INVENTION

The present invention relates generally to fiber-optic communication systems. More specifically, the present invention relates to applying error-correction codes to improve spectral efficiency in wavelength-division multiplexing (WDM) fiber optic communication systems.

Error correction codes have been applied with varying degrees of success to various types of optical systems, including WDM systems, in attempts to improve system performance. First, for example, error codes have been applied to provide a performance margin to compensate for minute device and subsystem flaws. See, e.g., *Optical Fiber Telecommunications IIIA*, §3.6.1, Ed. Kaminow and Koch, Academic Press, 1997. As a result, less expensive and more mass-producible optoelectronics can be used, and the overall system lifetime can be extended as devices slowly degrade.

Second, error-correction codes also have been applied to reduce the required optical signal power. See, e.g., *Optical Fiber Telecommunications IIIA*, §3.6.2. Because error correction codes allow an optical system to operate at lower optical signal powers, the number of optical amplifiers necessary in a long distance fiber-optic link can be reduced. This is particularly important in, for example, transoceanic fiber-optic links traversing long distances through difficult-to-access environments that are hostile to system equipment that rely on electronic components. Such transoceanic fiber-optic links often use optical amplification to increase the optical-signal power rather than electronic regeneration which is less reliable and more expensive to maintain in such inaccessible and hostile environments. By applying error-correction codes to reduce the number of required optical amplifiers for a given fiber-optic link, the overall cost of installing that link is reduced and the overall reliability of that link is improved.

Third, error correction codes also have been applied to shift the operation point of WDM channels, thereby allowing more cross talk and nonlinearities. See, e.g., *Optical Fiber Telecommunications IIIA*, §3.6.3; Livas, J. C., et al., "Forward error correction in a 1 Gbit/s/channel wavelength-division multiplexed system," *IEEE/LEOS Summer Topical Meeting on Optical Networks and their Enabling Technologies*, July 1994. As FIG. 1 illustrates, the bit-error rate is an exponential function of the channel density. In other words, as the channel spacing for a WDM system is decreased, the bit-error rate of the receiver system increases relatively slightly until some point (i.e., the "operation point" labeled in FIG. 1 as 10a) at which the bit-error rate dramatically increases. After the operation point for a system has been determined, error correction codes have been applied to shift this operation point (labeled in FIG. 1 as 10b) so that WDM channels can be spaced closer together without dramatically increasing the bit-error rate. This application of error-correction codes to a WDM system has yielded an increase in channel packing density of a factor 2.5 for an error correction code with a coding gain of 3.7 dB.

These known applications have applied error-correction codes to WDM system in only a limited sense with limited results. Known applications of error correction codes have not provided the fullest performance benefits possible.

SUMMARY OF THE INVENTION

Embodiments of the present invention address the shortcomings of the known applications of error-correction codes. One embodiment of the present invention is a method for designing an optical system. The optical system launches optical signals modulated with data into a fiber link having a property of inducing nonlinear distortion of the optical signals as a function of signal power of the optical signals and distance traversed in the fiber link. A Q-factor curve for the fiber link is determined as a function of the signal power. A signal power is preselected based on the Q-factor curve. The preselected signal power is associated with a set of channels. A coding gain is preselected based on the preselected signal power and a desired channel spacing for the set of channels.

Another embodiment is a method for launching optical signals modified with data into a fiber link. The data is error-correction coded with a coding gain to produce encoded data signals. The encoded data signals is multiplexed to produce channels each of which carries optical signals based on the encoded data signals. A preselected coding gain is based on a preselected signal power associated with the channels and a desired channel spacing for the channels

BRIEF DESCRIPTION OF THE DRAWINGS

The various features of the invention will best be appreciated by simultaneous reference to the description which follows and the accompanying drawings, in which.

DETAILED DESCRIPTION

Figure 1:
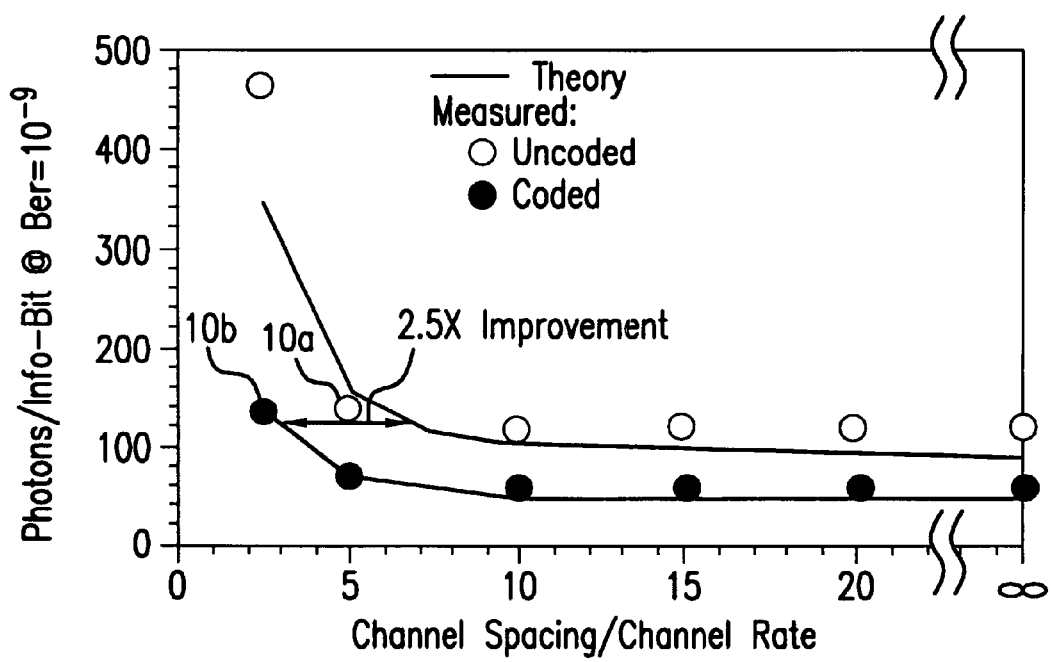
FIG. 1 shows the receiver sensitivity versus the channel spacing for a prior art WDM system where the operation point has been shifted due to the application error correction codes.

As discussed above in the "Background of the Invention" section, error-correction codes have been applied to shift the pre-determined operation point of a WDM system thereby allowing a small increase in spectral efficiency. Error-correction codes have also been applied to transoceanic systems, after the systems have already been optimized, to provide an extra margin to compensate for performance degradation due to aging. These known applications of error-correction codes, however, fail to take full advantage of the benefit of error-correction codes when initially determining the operation point of a WDM system.

The present invention recognizes a more complete benefit and effective application of error-correction codes for optical systems such as, for example, a transoceanic WDM system. As one contextual example (although not the only example), consider optical systems with long-distance fiber links that use optical amplification. The accumulation of noise is a significant concern when using optical amplification rather than regeneration in long-distance fibers. To overcome the noise associated with amplified spontaneous emission (ASE) that accumulates over the length of a long-distance fiber, a WDM system is typically designed so that the signal power is increased. The signal power, however, can be increased only just so far before nonlinear distortion occurs, thereby again limiting the performance of a WDM system. Nonlinear distortion of the optical signals includes such nonlinear phenomena as four-wave mixing, higher-order dispersion, cross-phase modulation, self-phase modulation, Kerr effect, Brillouin scattering, and Raman scattering.

Said another way, the ASE noise of a WDM system can be overcome by increasing the signal power while the nonlinear impairments can be overcome by reducing the signal power. Because these techniques are incompatible, a WDM system is designed for an optimal signal power that is sufficiently high to overcome the ASE noise while sufficiently low to avoid the rapid onset of nonlinearities.

Note that the term "signal power" refers to the power level of the optical signal, which while propagating in within the fiber link, can be distorted in a nonlinear fashion. This potential nonlinear distortion of the optical signal can be discussed in reference to several measures of signal power, such as the average signal power, the amplified output signal power (i.e., the signal power measured after being amplified within the fiber link), the average signal power per channel (i.e., per WDM channel), and/or the amplified output signal power per channel. Although these measures of signal power are not equivalent, nonlinear distortion of optical signals can be considered as a function of any of these measures (as well as other measures of signal power not explicitly listed here).

The present invention recognizes that by preselecting the signal power of an optical system and preselecting the coding gain of an error-correction code according to certain principles, the spectral efficiency of the optical system can be greatly improved. More specifically, the signal power can be preselected at a reduced level where nonlinear distortion of optical signals is benign. For example, the signal power can be preselected at a point where nonlinear crosstalk between channels is less than or equal to the ASE noise.

An error-correction code can be applied to compensate for the reduction in signal power, thereby allowing the optical system to operate at a lower signal-to-noise ratio (SNR) (without a loss in transmission quality, i.e., without increasing the BER). The coding gain of the applied error-correction code can be preselected based on the preselected signal power and the desired channel spacing for the channels. In other words, the particular coding gain required depends upon the extent to which the signal power is reduced and the channels are more closely spaced.

Once the signal power is reduced, the rapid onset of nonlinearities occurs only for much more closely spaced WDM channels for a given data line rate. Allowing more closely spaced WDM channels for a given data line rate is synonymous with increasing the spectral efficiency. The spectral efficiency has units of (bit/s)/Hz, and is defined for a given WDM channel as the data line rate divided by the spectral bandwidth. Consequently, the larger the coding gain, the lower the signal power that can be preselected and the greater the spectral efficiency that can be achieved.

Figure 2:
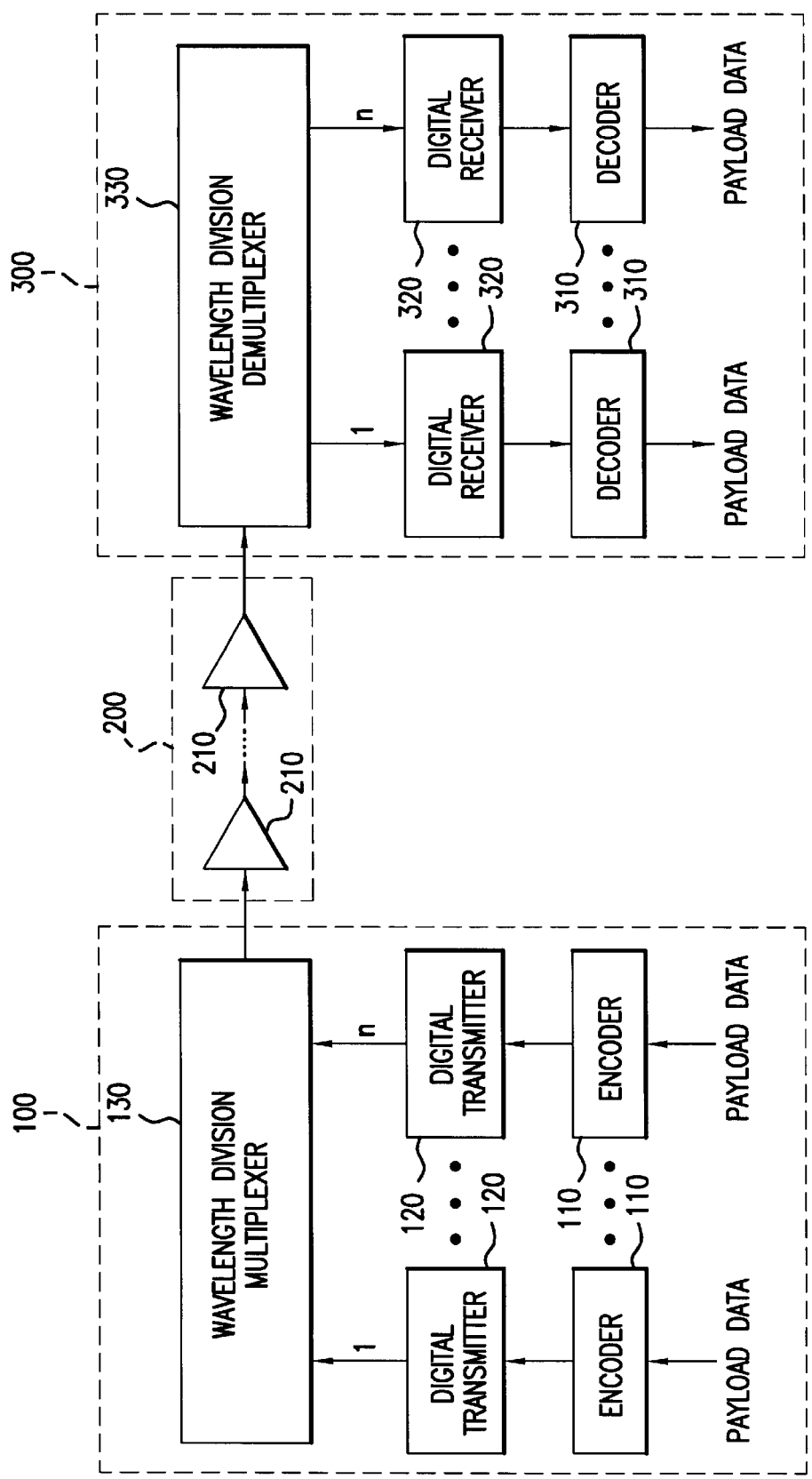
FIG. 2 illustrates a system block diagram of an optical communication system according to an embodiment of the present invention.

FIG. 2 illustrates a system block diagram of an optical communication system according to an embodiment of the present invention. Transmitter system 100 is connected to fiber link 200 which is connected, in turn, to receiver system 300. Transmitter system 100 includes a series of encoders 110 and digital transmitters 120 connected to a wavelength division multiplexer 130. For each WDM channel, an encoder 110 is connected to a digital transmitter 120 which, in turn, is connected to wavelength division multiplexer 130. In other words, wavelength division multiplexer 130 receives signals associated with multiple WDM channels, each of which has an associated digital transmitter 120 and encoder 110.

Encoders 110 can be any type of encoder that provides a sufficiently high coding gain so that the signal power can be reduced to the point where non-linear distortion of transmitted optical signals are negligible. The specific gain required, of course, will depend upon the particular system parameters and the specific fiber link. For example, for particularly long fiber links, such as transoceanic fiber links, the coding gain will need to be higher than would be the case for a shorter fiber link. For a typical transoceanic fiber link, the coding gain can be, for example, approximately 8 dB or higher. Such coding gains can be accomplished using powerful forward error correction codes, such as a Reed Solomon (RS) 255/239 code concatenated with a soft decision Viterbi convolutional (r=½) code with constraint length, k=7. Alternatively, such coding gains can be accomplished using a turbo code, i.e., essentially a combination of two convolutional codes. See, e.g., C. Berrou, A. Glavieux and P. Thitmajshima, "Near Shannon limit error-correcting coding and decoding: Turbo-codes," in *Proc ICC '93*, Geneva, Switzerland, May 1993, pp. 1063–70; the entire contents of which are incorporated herein by reference for background purposes. These types of encoding systems can yield net coding gains of, for example, approximately 10 dB or more.

Digital transmitter 120 can be any type of system component that converts electrical signals to optical signals. For example, digital transmitter 120 can include an optical source such as a semiconductor laser or a light-emitting diode which can be modulated directly by, for example, varying the injection current.

WDM multiplexer 130 can be any type of device that combines signals from multiple WDM channels. For example, WDM multiplexer 130 can be a star coupler, a fiber Fabry-Perot filter, an in-line Bragg grating, a diffraction grating, cascaded filters and a wavelength grating router, among others.

Fiber link 200 can include, for example, optical amplifiers 210 interconnected by optical fiber. Fiber link 200 has such properties as to induce nonlinear distortion of propagating optical signals as a function of the signal power of the optical signals and the distance traversed. The causes of the nonlinear distortion of propagated optical signals in fiber link 200 include, but are not limited to, the Kerr effect, Brillouin scattering and Raman scattering. The length of fiber link 200, for example, can span distances of 1,500 km or greater.

Receiver system 300 includes a series of decoders 310, digital receivers 320 and a wavelength division demultiplexer 330. A decoder 310 can include, but is not limited to, a four-level soft-decision circuit followed by a priority decoder, a Viterbi decoder with de-interlever and a Reed Solomon decoder (255, 239; T=8). The Reed Solomon decoder circuit can be, for example, the LSI Logic commercial VLSI IC type L64709. A digital receiver 320 can be, for example, a direct detection automatic gain control (AGC) receiver. WDM demultiplexer 330 can be any type of device that separates signals from multiple WDM channels. For example, WDM demultiplexer 330 can be a star coupler, a fiber Fabry-Perot filter, an in-line Bragg grating, a diffraction grating, cascaded filters and a wavelength grating router, among others.

Embodiments of the present invention can be used with various types of signal formats. The chirped-return-to-zero (CRZ) signal format has been used typically to provide robust WDM transoceanic transmission. Although the CRZ signal format broadens the spectral width of an optical signal, the CRZ signal format typically is used in combination with aggressive dispersion management, orthogonal polarization between neighboring WDM channels and increased effective area core fiber so that the amount of chirp is reduced and the overall system spectral efficiency is improved over the otherwise standard chirped signal format.

The CRZ signal format, however, broadens the optical signal to about three times the data line rate, and as such presents a fundamental limit on spectral efficiency of long-distance fiber links. Because embodiments of the present invention provide sufficient robustness for long-distance fiber links, signal formats other than just the CRZ format are possible with embodiments of the present invention. In other words, embodiments of the present invention allow the use of signal formats such as non-return-to-zero (NRZ) or return-to-zero (RZ) or some form of M-ary digital signaling (e.g., duobinary, phase-shift key (PSK) on subcarrier, etc.) that are more spectrally efficient than a CRZ signal format.

As Table 1 further illustrates below, embodiments of the present invention produce several new and unexpected results even though a known system uses error correction with a similar coding gain. First, by optimizing the signal power for the system while considering the benefits of error correction (rather than using error correction merely to provide engineering margins), the signal power can be greatly reduced without effecting system performance. Consequently, the nonlinear distortion of optical signals, which typically accumulates over long-distant optically-amplified fiber links is significantly reduced.

Second, because the nonlinear distortion is significantly reduced, the spectral efficiency can be significantly increased. Note that a known system with a similar coding gain does not achieve the significantly improved spectral efficiency of embodiments of the present invention.

Finally, because the nonlinear distortion is significantly reduced, signal formats that otherwise would not be feasible can be used. Consequently, the spectral bandwidth for each WDM channel need not be broadened to compensate for the nonlinear distortion typically accumulating in long-distant optically-amplified fiber links. Therefore, the unbroadened WDM channels can be more densely packed than is the case with the CRZ signal format typically used in transoceanic fiber links.

Table 1 shows for each optical system the amplified output signal power per channel, the coding gain applied by an error correction coder, the effective bandwidth (BW) due to signal conditioning, and the spectral efficiency. The amplified output signal power per channel is the peak signal power per WDM channel as measured in segments between consecutive optical amplifiers within the fiber link. The amplified output signal power per channel is proportional to the average signal power per channel within the fiber link. The effective BW due to the signal conditioning indicates the extent that the signal bandwidth is increased beyond the data line rate for a given signal format.

Note that the values provided within Table 1 are typical values for known systems or estimated values for the embodiments of the present invention. The estimated values are qualitative in nature and are intended merely to show the relative performance expected for embodiments of the present invention. The measured values relating to the performance of embodiments of the present invention may, in fact, vary from those shown in Table 1.

Also note that Table 1 is based on the assumption that an equal level of performance is achieved for the systems illustrated. In other words, the system parameters shown in Table 1 are based on an assumed equivalent bit error rate (BER) at the receiver. Similarly, Table 1 assumes that the length of the fiber link for each system is the same, approximately 7,500 km (e.g., the length of a transoceanic fiber link). Table 1 presumes a channel spacing of 0.6 nm; embodiments of the present invention using different channel spacing would have different associated performance values.

TABLE 1

| | Amplified Output Signal Power/ Channel | Coding Gain | Effective BW Signal Conditioning | Spectral Efficiency |
|---|---|---|---|---|
| Known system with CRZ | −2 dBm | 2 dB | 4 × line rate | 0.05 (bits/s)/Hz |
| Embodiments of present invention with CRZ | −4 dBm | 2 dB | 3 × line rate | 0.1 (bit/s)/Hz |
| Embodiments of present invention with RZ | −7.5 dBm | 6.5 dB | 1 × line rate | 0.3 (bit/s)/Hz |
| Embodiments of present invention with NRZ | −7 dBm | 9 dB | 0.5 × line rate | 0.3 (bit/s)/Hz |

Consider the known system referred to in Table 1 that uses the CRZ signal format and uses error correction merely to provide an engineering margin in its design (i.e., the amplified output signal power per channel being optimized without considering error correction). This known system has been designed with a relatively high amplified output signal power per channel, i.e., −2 dBm. Due to this relatively high signal power, the CRZ format is utilized to compensate for the consequential nonlinear signal distortion. The CRZ signal format results in an effective BW of approximately four times the data line rate. Even with the use of error correction in this known system, the spectral efficiency is only approximately 0.05 (bits/s)/Hz.

Now consider an embodiment of the present invention in which the CRZ signal format is used. By considering the application of error-correction techniques when optimizing the system design, the amplified output signal power per channel is greatly reduced (i.e., −4 dBm) from the known system (i.e., −2 dBm). Because the system can operate with a lower signal power, the nonlinear distortion is greatly reduced and, consequently, the WDM channels can be more densely packed. In other words, the spectral efficiency for this embodiment of the present invention (i.e., 0.1 (bits/s)/Hz) is greatly increased over the known system (i.e., 0.05

(bits/s)/Hz). Note that this improvement is achieved with error correction coders having the same coding gain.

Because embodiments of the present invention achieve lower nonlinear distortion of the optical signals, signal formats other than CRZ are possible even though the length of the fiber link is very great, for example 7,500 km. As Table 1 illustrates, embodiments of the present invention can use such signal formats as RZ and NRZ (although not illustrated in Table 1, additional signal formats are possible such as duo-binary). For example, by changing the signal format from CRZ to RZ, the effective BW due to signal conditioning is reduced from three to four times the data line rate to only the data line rate; consequently, the spectral efficiency improves from 0.1 (bits/s)/Hz to 0.3 (bits/s)/Hz. Alternatively, by changing the signal format from CRZ to NRZ, the effective BW due to signal conditioning is reduced from three to four times the data line rate to only one-half the data line rate; consequently, the spectral efficiency again improves from 0.1 (bits/s)/Hz to 0.3 (bits/s)/Hz.

As illustrated in Table 1, the spectral efficiency for the RZ and NRZ signal formats are the same even though the amplified output signal power/channel, effective BW due to signal conditioning and coding gain vary. Even though the NRZ signal format has a lower effective BW due to signal conditioning than that for the RZ signal format, more coding gain is required for the NRZ signal format than is required for the RZ signal format. Consequently, the resulting amplified output signal power per channel is approximately the same and the spectral efficiency is approximately the same.

Figure 3:
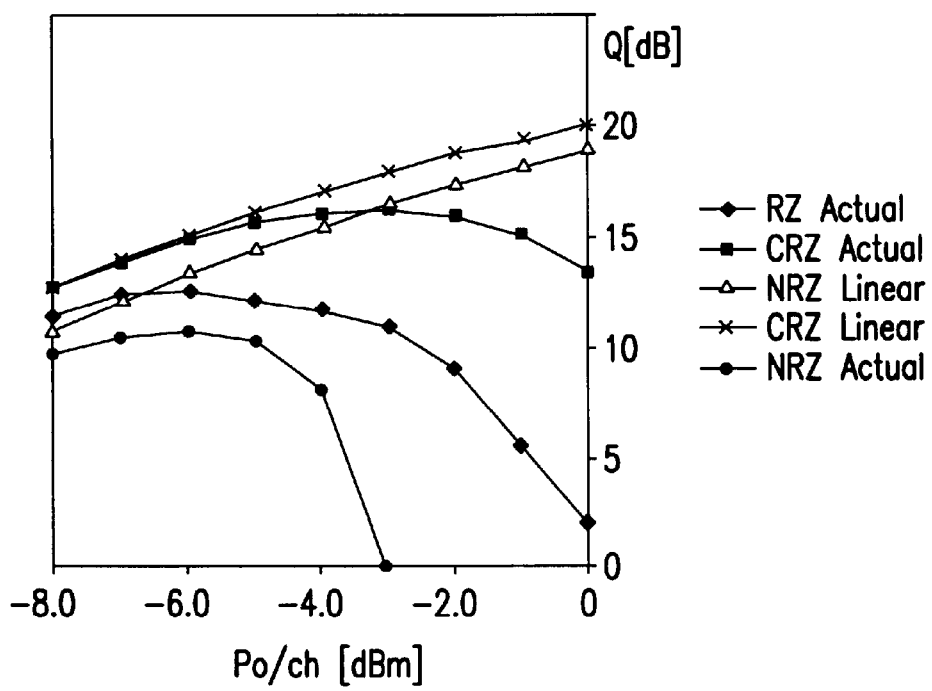
FIG. 3 is a graph indicating the Q factor versus amplified output signal power per channel for embodiments of the present invention having a channel spacing of 0.6 nm.
Figure 4:
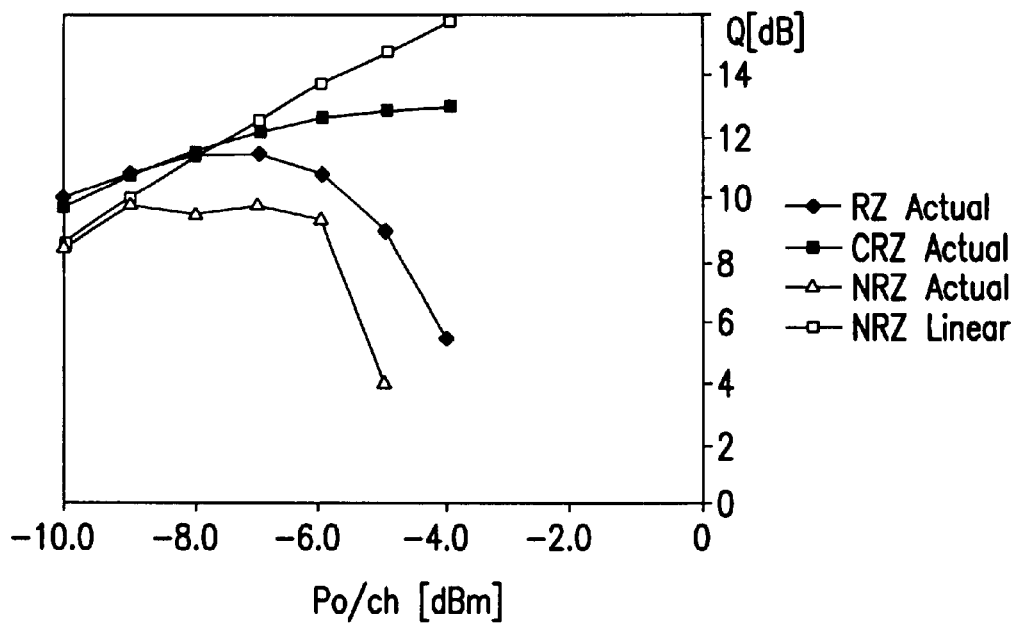
FIG. 4 is a graph indicating the Q factor versus amplified output signal power per channel for embodiments of the present invention having a channel spacing of 0.4 nm.
Figure 5:
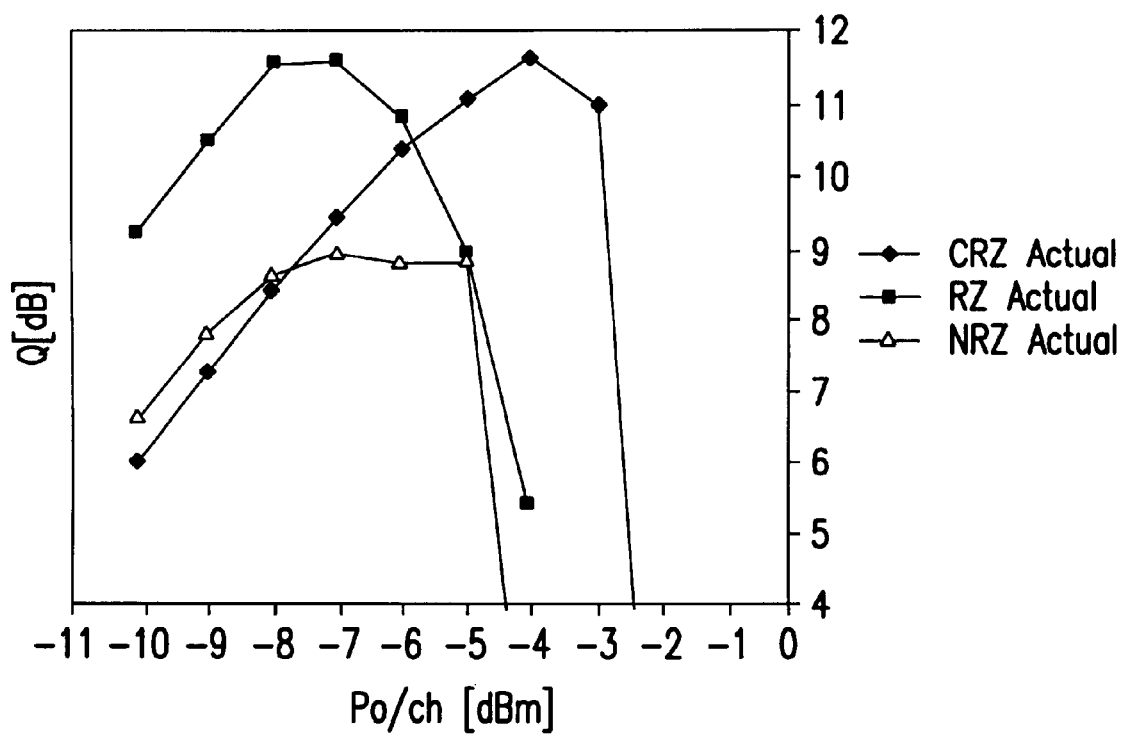
FIG. 5 is a graph indicating the Q factor versus amplified output signal power per channel for embodiments of the present invention having a channel spacing of 0.3 nm.

The particular manner in which the signal power for embodiments of the present invention can designed optimally is discussed in reference to the examples illustrated by FIGS. 3–5. In other words, the Q-factor versus signal power curves shown in FIGS. 3–5 are typically generated to select the optimal signal power for a specific optical system having a given channel spacing. The Q factor is a measure of performance typically used to characterize and design optical systems having, for example, long-distance, optically-amplified fiber links. The Q factor is the argument to the normal error function for the purpose of calculating the BER. For a general discussion of the Q factor, see, "Measures of System Margin," §10.5, *Optical Fiber Telecommunications*, which is incorporated herein by reference for background purposes.

FIG. 3 is a graph indicating the Q factor (in units of dB) versus amplified output signal power per channel (in units of dBm) for embodiments of the present invention using various types of signal formats. The signal formats considered in FIG. 3 are CRZ, RZ and NRZ where the actual Q factor is estimated considering nonlinear effects, and CRZ and NRZ where the Q factor is estimated without considering nonlinear effects (i.e., considering only linear effects). The values shown in FIG. 3 are based on a long-distance optical system with optical amplification having a data rate of 10.6 Gbit/s, a fiber link length of 7250 km, WDM channel spacing of 0.6 nm, extinction ratio of 15 dB, back-to-back Q of 24 dB, amplifier spacing of 57.5 km and a noise figure of 4.5 dB. Note that the optical systems discussed in reference to FIG. 3 are based on a particular fiber link and will have different values as different fiber links are considered.

Consider, for example, the Q-factor curve for the actual CRZ signal format which has a peak for the amplified output signal power per channel at approximately −3 dBm. For the particular fiber link, the optimal signal power is at or below the peak on the Q-factor curve: as the signal power is increased, nonlinear distortion increases to the point of reducing the system performance and, consequentially, the spectral efficiency; as the signal power is decreased, the BER increases due to the reduced SNR if not compensated for by the coding gain.

Note that the Q-factor curve for the actual CRZ signal, as the amplified output signal power per channel is reduced, the Q-factor curve approaches the theoretical limit for linear operations of optical systems with CRZ signal format. By selecting the optimal signal power at or near the peak of the Q-factor curve, embodiments of the present invention can be designed to operate essentially linearly (i.e., just outside the linear region of operation with small nonlinearities to take advantage with respect to temporal eye-opening). As embodiments of the present invention are designed with closer channel spacing, the optimal signal power should be selected further away from the peak of the Q-factor curve and more towards linear operation.

The optimal signal power selected in the design of embodiments of the present invention can be lower than that normally expected with known optical systems. For example, a known optical system having a single channel has a signal power associated with a Q factor of 16 dB or greater. Embodiments of the present invention can be designed with a signal power less than that associated with a Q factor of 16 dB or greater.

Consider, as another example, the Q-factor curve for the actual NRZ signal format that has a peak for the amplified output signal power per channel at approximately −6 dBm. Although the amplified output signal power per channel is not extended in FIG. 3 beyond −8 dBm, the Q-factor curve for the actual NRZ signal format can be envisioned as approaching the Q-factor curve for the NRZ signal format with linear operations.

FIG. 4 is a graph indicating the Q factor (in units of dB) versus amplified output signal power per channel (in units of dBm) for embodiments of the present invention using various types of signal formats. The values shown in FIG. 4 are based on a long-distance optical system similar to that related to FIG. 3, except that the WDM channel spacing is 0.4 nm and the data rate is 10.7 Gbit/s.

As FIG. 4 illustrates, the Q-factor curve for the actual CRZ, RZ and NRZ signal formats have a peak for the amplified output signal power per channel at −4 dBm, −8 dBm and −9 dBm, respectively. The peak in the amplified output signal power per channel for the NRZ signal format occurs at a point where the Q-factor curve for the actual NRZ signal substantially overlaps the Q-factor curve for the linear NRZ.

Consider the difference between FIG. 3 where the WDM channel spacing is 0.6 nm and FIG. 4 where the WDM channel spacing is 0.4 nm. The closer channel spacing can be achieved by designing the optical system so that the signal power (e.g., the amplified output signal power per channel) is reduced while compensating for the reduced signal power by using a coding scheme with a higher coding gain. For example, in embodiments of the present invention illustrated by FIGS. 3 and 4, the channel spacing can be reduced from 0.6 nm to 0.4 nm by reducing the amplified output signal power per channel from −3 dBm to −4 dBm for the CRZ signal format, from −6 dBm to −8 dBm for the RZ signal format, and from −6 dBm to −9 dBm for the NRZ format.

FIG. 5 is a graph indicating the Q factor (in units of dB) versus amplified output signal power per channel (in units of dBm) for embodiments of the present invention using various types of signal formats. The values shown in FIG. 5 are based on a long-distance optical system similar to that related to FIGS. 3 and 4 except that the WDM channel spacing is 0.3 nm and the data rate is 10.7 Gbit/s. As FIG. 5 illustrates, the Q-factor curve for the actual CRZ, RZ and NRZ signal formats have a peak for the amplified output signal power per channel at −4 dBm, −8 dBm and −7 dBm, respectively.

The signal power cannot be reduced indefinitely to achieve closer WDM channel spacing; in other words, the signal power can be reduced only until the signal cannot be recovered even with coding gain, or the required coding gain is prohibitively high. It is expected the WDM channel spacing can be reduced to about 0.3 nm before the limit is reached.

It should, of course, be understood that while the present invention has been described in reference to particular system configurations, components, processes and signal formats, other system configurations, components, processes and signal formats should be apparent to those of ordinary skill in the art. For example, although certain data line rates such as 10.7 Gbit/s were discussed above, embodiments of the present invention can operate at other data line rates.

What is claimed is:

1. A method for designing an optical system launching optical signals modulated with data into a fiber link having a property of inducing nonlinear distortion of the optical signals as a function of signal power of the optical signals and distance traversed in the fiber link, comprising:

determining a Q-factor curve for the fiber link as a function of the signal power;

preselecting a signal power based on the Q-factor curve, the preselected signal power being associated with a plurality of channels; and preselecting a coding gain based on the preselected signal power and a desired channel spacing for the plurality of channels.

2. The method of claim 1, wherein the preselected signal power is a point on the Q-factor curve where the nonlinear crosstalk associated with the plurality of channels is reduced to a negligible level.

3. The method of claim 1, wherein the preselected signal power is a point on the Q-factor curve where the nonlinear crosstalk associated with the plurality of channels is reduced to below the amplified spontaneous emission (ASE) noise associated with the plurality of channels.

4. The method of claim 1, wherein:

the preselected signal power associated with the plurality of channels is sufficiently low so that the optical system operates without appreciable nonlinear crosstalk.

5. The method of claim 1, wherein:

the preselected signal power associated with the plurality of channels is less than a normally expected signal power.

6. The method of claim 1, wherein sources of the nonlinear distortion of the optical signals include Kerr effect, Brillouin scattering and Raman scattering.

7. The method of claim 1, further comprising:

selecting a non-return-to-zero (NRZ) signal format for the optical signals associated with the plurality of channels, a spectral efficiency associated with the plurality of channels being greater than that associated with optical signals having a chirped return-to-zero (CRZ) format at a second preselected signal power greater than the preselected signal power.

8. The method of claim 1, further comprising:

selecting a return-to-zero (RZ) signal format for the optical signals associated with the plurality of channels, a spectral efficiency associated with the plurality of channels being greater than that associated with optical signals having a chirped return-to-zero (CRZ) format at a second preselected signal power greater than the preselected signal power.

9. The method of claim 1, wherein the fiber link is all optically amplified and the distance of the fiber link spans at least 1,500 km.

10. The method of claim 1, wherein a channel spacing associated with the plurality of wavelengths is less than five times an electrical signal bandwidth of the encoded data signal.

* * * * *